United States Patent
Yamamoto et al.

(10) Patent No.: US 10,458,488 B2
(45) Date of Patent: Oct. 29, 2019

(54) ONE-WAY CLUTCH

(71) Applicant: JTEKT CORPORATION, Osaka-shi, Osaka (JP)

(72) Inventors: Ikuo Yamamoto, Kashiwara (JP); Tomoya Yamatani, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 52 days.

(21) Appl. No.: 15/372,760

(22) Filed: Dec. 8, 2016

(65) Prior Publication Data

US 2017/0175826 A1 Jun. 22, 2017

(30) Foreign Application Priority Data

Dec. 16, 2015 (JP) ................................. 2015-245388

(51) Int. Cl.
*F16D 41/067* (2006.01)
*F16D 41/06* (2006.01)

(52) U.S. Cl.
CPC .... *F16D 41/067* (2013.01); *F16D 2041/0605* (2013.01)

(58) Field of Classification Search
CPC .................. F16D 41/067; F16D 2041/0605
USPC ......................................... 192/45.006, 45.008
See application file for complete search history.

(56) References Cited

U.S. PATENT DOCUMENTS

| | | | | |
|---|---|---|---|---|
| 4,039,058 A | * | 8/1977 | Trzebiatowski | B65G 23/26 188/82.84 |
| 5,117,954 A | * | 6/1992 | Iga | F16D 41/067 192/42 |
| 5,119,919 A | * | 6/1992 | Iga | F16D 41/067 192/45.012 |
| 7,370,741 B2 | * | 5/2008 | Shimomura | F02N 15/023 192/110 B |
| 2002/0100653 A1 | * | 8/2002 | Ouchi | F16D 41/00 192/45.008 |
| 2002/0183147 A1 | * | 12/2002 | Fujiwara | F16D 41/067 474/70 |
| 2005/0087417 A1 | * | 4/2005 | Shimomura | F02N 15/023 192/45.015 |
| 2011/0168119 A1 | * | 7/2011 | Steele | F02N 15/023 123/179.25 |
| 2012/0227540 A1 | * | 9/2012 | Steele | F02N 15/022 74/7 C |
| 2014/0034439 A1 | * | 2/2014 | Fenayon | F16D 41/06 192/45.004 |

(Continued)

FOREIGN PATENT DOCUMENTS

| | | | | |
|---|---|---|---|---|
| JP | 3170606 B2 | * | 5/2001 | ........... F16D 41/067 |
| JP | 2013-257024 A | | 12/2013 | |

*Primary Examiner* — Timothy Hannon
(74) *Attorney, Agent, or Firm* — Oliff PLC

(57) ABSTRACT

A one-way clutch includes an inner ring, an outer ring, a plurality of rollers, an annular cage that holds the rollers, and springs that bias the rollers toward a first side in a circumferential direction. The inner ring has a rib portion located on a first side in an axial direction and protruding outward in a radial direction. The cage has a pair of annular portions provided on the first side and a second side in the axial direction with respect to the rollers and a plurality of cage bars. One of the annular portions on the first side in the axial direction has an abutting contact surface that comes into abutting contact with the rib portion in the axial direction.

11 Claims, 7 Drawing Sheets

(56) References Cited

U.S. PATENT DOCUMENTS

| | | | | |
|---|---|---|---|---|
| 2015/0204395 A1* | 7/2015 | Mori | .................... | F16D 41/067 |
| | | | | 192/45.008 |
| 2016/0010705 A1* | 1/2016 | Mori | .................... | F16D 41/064 |
| | | | | 192/45.006 |
| 2016/0097432 A1* | 4/2016 | Xiong | ................... | F16D 41/066 |
| | | | | 192/45.008 |
| 2016/0169302 A1* | 6/2016 | Mori | .................... | F16F 15/123 |
| | | | | 474/166 |

* cited by examiner (Prior Art)

ONE-WAY CLUTCH

INCORPORATION BY REFERENCE

The disclosure of Japanese Patent Application No. 2015-245388 filed on Dec. 16, 2015 including the specification, drawings and abstract, is incorporated herein by reference in its entirety.

BACKGROUND OF THE INVENTION

1. Field of the Invention

The invention relates to a one-way clutch.

2. Description of the Related Art

A one-way clutch is used for various types of equipment (see, for example, Japanese Patent Application Publication No. 2013-257024 (JP2013-257024 A)), by way of example, for an alternator in an automobile. As depicted in FIG. 6, a one-way clutch includes an inner ring 90, an outer ring 91, a plurality of rollers 92, an annular cage 93, and springs 94. The rollers 92 are provided between the inner ring 90 and the outer ring 91. The cage 93 holds the rollers 92. The springs 94 bias the rollers 92. A plurality of cam surfaces 95 is formed on an outer periphery of the inner ring 90. A wedge-like space 100 is formed between each of the cam surfaces 95 and an inner peripheral surface 91a of the outer ring 91. One roller 92 is provided in each of the wedge-like spaces 100. A one-way clutch for an alternator is configured such that the outer ring 91 rotates integrally with a pulley.

In the one-way clutch, when the rotational speed of the outer ring 91 is higher than the rotational speed of the inner ring 90 and the outer ring 91 rotates relative to the inner ring 90, each of the rollers 92 is engaged between the corresponding cam surface 95 and the outer ring 91. This makes the inner ring 90 and the outer ring 91 unable to rotate relative to each other. When the rotational speed of the outer ring 91 is lower than the rotational speed of the inner ring 90, the rollers 92 are disengaged from the inner ring 90 and the outer ring 91. This makes the inner ring 90 and the outer ring 91 rotatable relative to each other.

When the one-way clutch as depicted in FIG. 6 is assembled, the annular cage 93 needs to be provided on the outer periphery of the inner ring 90. To achieve this, the cage 93 may be moved in an axial direction toward the inner ring 90 and assembled on the inner ring 90. To allow the one-way clutch to function as described above, the rollers 92 held by the cage 93 need to be allowed to engage appropriately with the cam surfaces 95 of the inner ring 90. Consequently, management of the positions of the inner ring 90 (cam surfaces 95) and the rollers 92 in an axial direction is important.

The cage 93 has a pair of annular portions 97, 97 and a plurality of cage bars 96 connecting the annular portions 97, 97 together. The rollers 92 are held by the annular portions 97, 97 so as to restrict movement of the rollers 92 in the axial direction. Thus, position management for the inner ring 90 (cam surfaces 95) and the rollers 92 in the axial direction substantially corresponds to position management for the inner ring 90 and the cage 93 in the axial direction.

In the conventional one-way clutch, as depicted in FIG. 7, recessed grooves 98 allowing formation of the respective cam surfaces 95 are formed on an outer peripheral surface of the inner ring 90 so as to be elongate in the axial direction. An axial end of each of the recessed grooves 98 is formed as an inclined surface 98a. Protruding portions 99 are provided on an inner periphery of each of the annular portions 97 of the cage 93. During assembly, when the cage 93 is moved in the axial direction with respect to the inner ring 90 (when, in FIG. 7, the cage 93 is moved in the direction of arrow X), each protruding portion 99 comes into contact with the corresponding inclined surface 98a and rides on the inclined surface 98a. Eventually, movement of the protruding portions 99 is restricted.

In the related art, each protruding portion 99 of the cage 93 rides on the corresponding inclined surface 98a of the inner ring 90 to position the cage 93 with respect to the inner ring 90 in the axial direction. However, in this case, the position of the cage 93 in the axial direction fails to be constant due to the magnitude of a load imposed on the cage 93 to move the cage 93 and an error in production accuracy (inclination angle) of the inclined surfaces 98a. The positioning of the cage 93 (the rollers 92 held by the cage 93) with respect to the inner ring 90 is unstable, leading to a possible increase in assembly error.

SUMMARY OF THE INVENTION

An object of the invention is to stabilize, in a one-way clutch, positioning of a cage with respect to an inner ring.

A one-way clutch in an aspect of the invention includes an inner ring, an outer ring, a plurality of rollers provided between the inner ring and the outer ring, an annular cage that holds the rollers, and springs each bias a corresponding one of the rollers toward a first side in a circumferential direction of the one-way clutch. The inner ring has a rib portion located on a first side in an axial direction and protruding outward in a radial direction. The cage has a pair of annular portions, one of the annular portions provided on the first side and the other provided on a second side in the axial direction with respect to the rollers, and a plurality of cage bars coupling the annular portions together. The annular portion on the first side in the axial direction has an abutting contact surface that comes into abutting contact with the rib portion in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
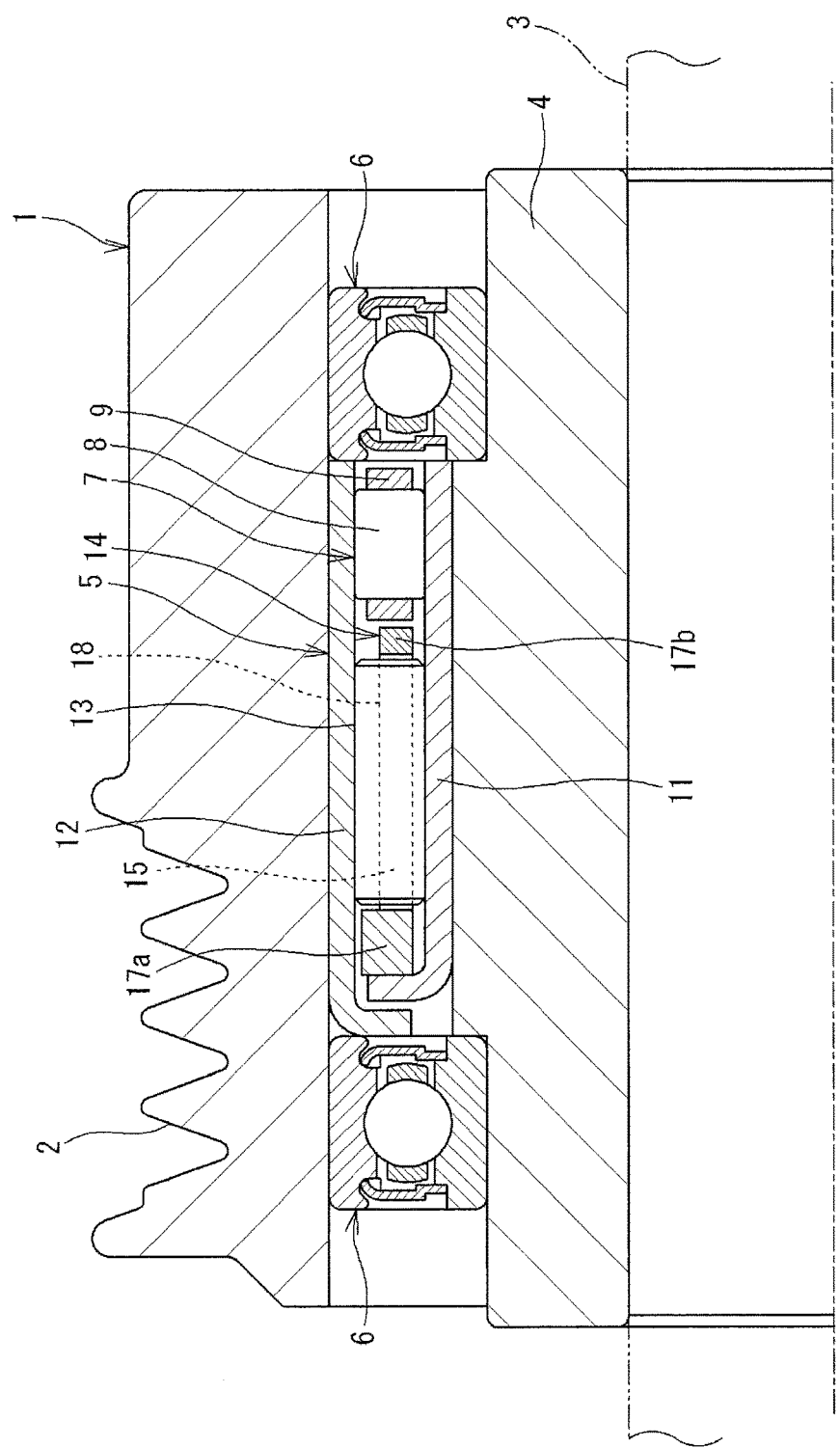
FIG. 1 is a sectional view depicting an example of a pulley apparatus including a one-way clutch.

An embodiment of the invention will be described below based on the drawings. FIG. 1 is a sectional view depicting an example of a pulley apparatus including a one-way clutch. A pulley apparatus 1 depicted in FIG. 1 is used for an alternator mounted in an automobile. Although not depicted in the drawings, rotation of a crankshaft of an engine of the automobile is transmitted to the alternator via an endless belt. Thus, the pulley apparatus depicted in FIG. 1 includes a pulley portion 2 around which the endless belt is wound.

The pulley apparatus 1 includes the pulley portion 2, a sleeve 4, a one-way clutch 5, and a pair of rolling bearings 6, 6. The sleeve 4 rotates integrally with a rotating shaft 3. The one-way clutch 5 and the rolling bearings 6, 6 are provided between the pulley portion 2 and the sleeve 4. The pulley apparatus 1 is of a type having a built-in one-way clutch. The pulley portion 2 is a cylindrical member around the outer periphery of which the endless belt is wound. The sleeve 4 is a cylindrical member externally fitted over and fixed to the rotating shaft 3. The one-way clutch 5 is provided in a central portion of an annular space between the pulley portion 2 and the sleeve 4 in an axial direction. The rolling bearings (in the present embodiment, ball bearings) 6, 6 are provided on opposite sides of the one-way clutch 5 in the axial direction.

Figure 2:
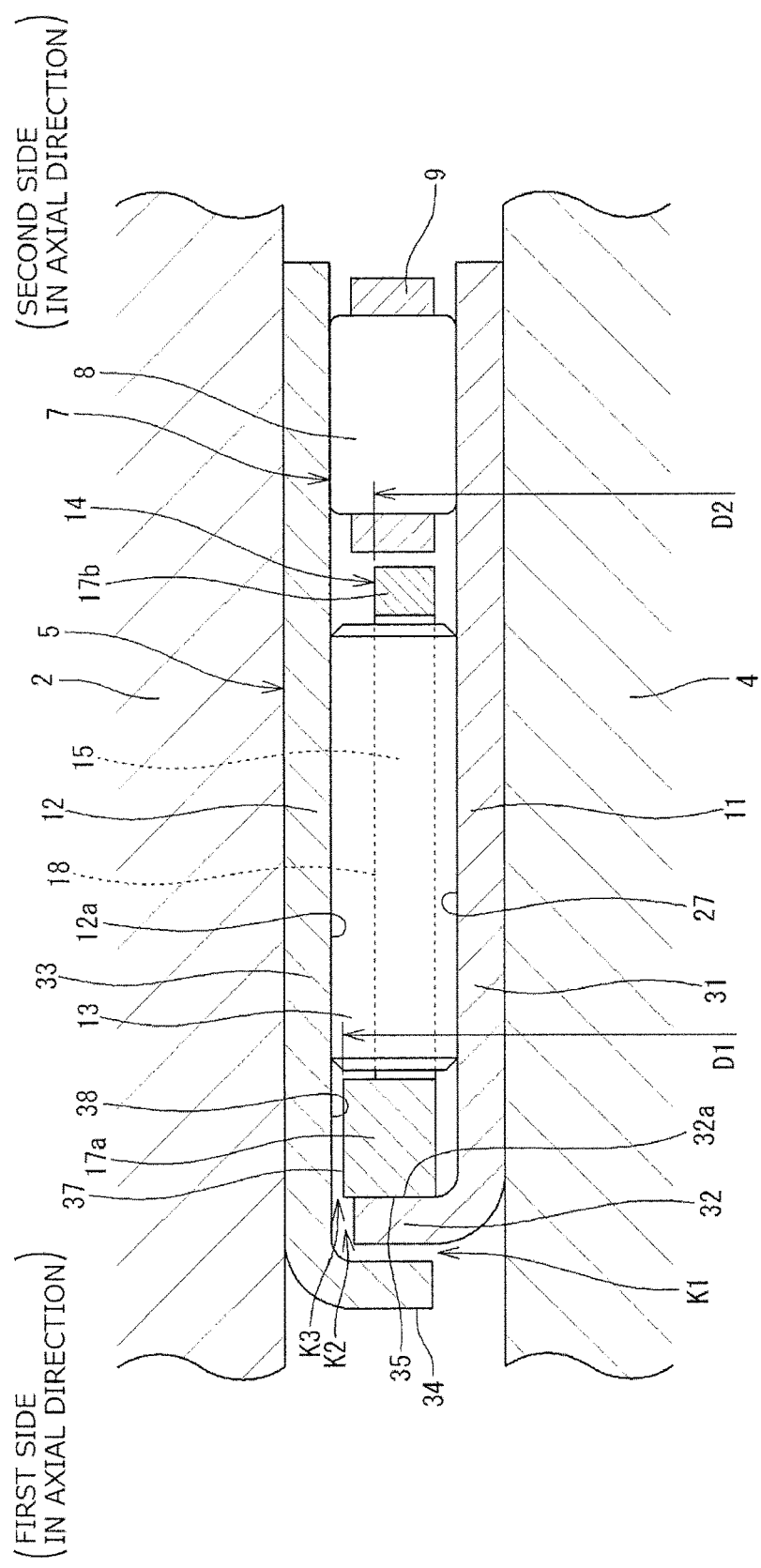
FIG. 2 is a sectional view of a part of the one-way clutch as viewed in a circumferential direction.

FIG. 2 is a sectional view of the one-way clutch 5. The one-way clutch 5 includes an inner ring 11, an outer ring 12, a plurality of rollers 13, an annular cage 14, and springs 15. The inner ring 11 rotates integrally with the sleeve 4. The outer ring 12 is positioned outward of the inner ring 11 in a radial direction so as to rotate integrally with the pulley portion 2. The rollers 13 are provided between the inner ring 11 and the outer ring 12. The cage 14 holds the rollers 13. The springs 15 bias the rollers 13. The one-way clutch 5 in the present embodiment is provided with a bearing portion 7 located between the inner ring 11 and the outer ring 12 and adjacent to the cage 14 in the axial direction. The bearing portion 7 has a plurality of cylindrical rollers 8 and an annular cage 9 that holds the cylindrical rollers 8. The bearing portion 7 concentrically holds the inner ring 11 and the outer ring 12 so as to make the inner ring 11 and the outer ring 12 rotatable relative to each other.

The inner ring 11 has a first main body tube portion 31 and a first rib portion 32. The first main body tube portion 31 has cam surfaces 27 with which the respective rollers 13 can engage. The first rib portion 32 is located on a first side (in FIG. 2, a left side) in the axial direction with respect to the inner ring 11 and protrudes outward in a radial direction. The first rib portion 32 is an annular portion extending radially outward of an end of the first main body tube portion 31 on the first side in the axial direction. The outer ring 12 has a second main body tube portion 33 and a second rib portion 34. The second main body tube portion 33 has a cylindrical inner peripheral surface 12a with which the rollers 13 can engage. The second rib portion 34 is located on the first side in the axial direction and protrudes inward in the radial direction. The second rib portion 34 is an annular portion extending radially inward of an end of the second main body tube portion 33 on the first side in the axial direction. The inner ring 11 and the outer ring 12 have no rib portion on a second side in the axial direction. Each of the main body tube portions 31, 33 has a linear shape along the axial direction. During assembly, the cage 14 can be moved closer to the inner ring 11 from the second side in the axial direction and placed on an outer periphery of the inner ring 11.

The second rib portion 34 of the outer ring 12 is positioned on the first side in the axial direction with respect to the first rib portion 32 of the inner ring 11. The second rib portion 34 faces the first rib portion 32 via a clearance K1 in the axial direction. An outer peripheral surface of the first rib portion 32 faces a part of an inner peripheral surface of the second main body tube portion 33 via a clearance K2.

The clearances K1, K2 form a labyrinth clearance between the inner ring 11 and the outer ring 12. The labyrinth clearance prevents grease in a clutch in which the rollers 13 are provided from leaking to the outside on the first side in the axial direction. In the present embodiment, as described below, a labyrinth clearance K3 is also formed between the outer ring 12 and the annular portion 17a of the cage 14 located on the first side in the axial direction to more effectively prevent leakage of the grease.

As described above, the inner ring 11 and the outer ring 12 are each a cylindrical member. Between the inner ring 11 and the outer ring 12, the rollers 13, the cage 14, the springs 15 (the number of which is the same as the number of the rollers 13), and the bearing portion 7 are provided.

Figure 3:
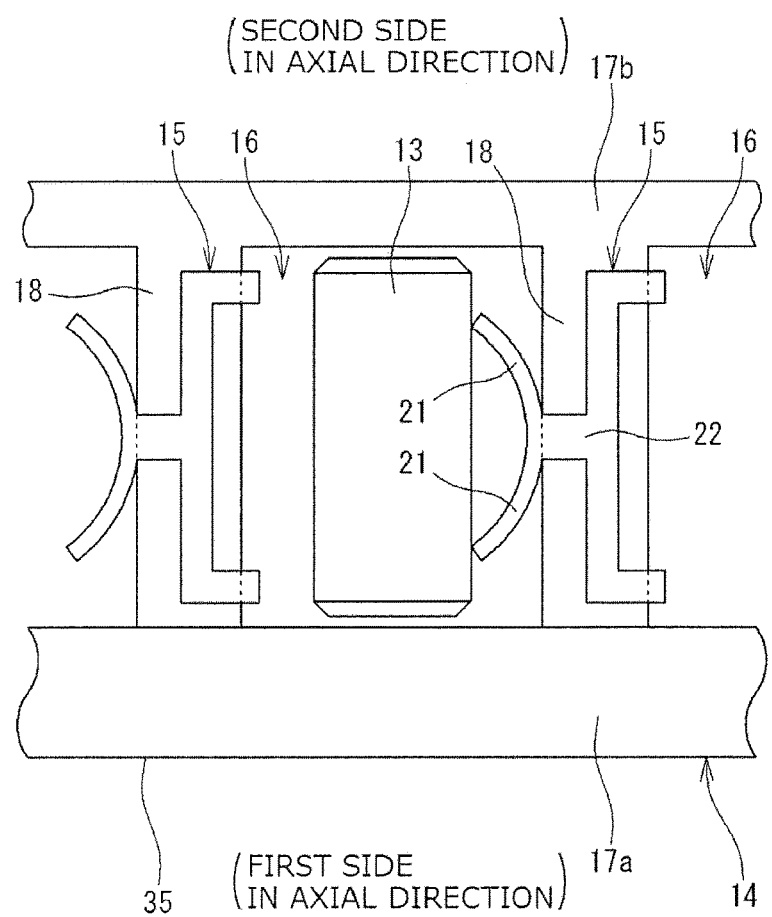
FIG. 3 is a diagram illustrating rollers, springs, and a cage as viewed from outside in a radial direction.

FIG. 3 is a diagram illustrating the roller 13, the springs 15, and the cage 14 as viewed from outside in the radial direction. The cage 14 has a pair of annular portions 17a, 17b and a plurality of cage bars 18. The annular portions 17a, 17b are provided on the opposite sides of each roller 13 in the axial direction. The cage bars 18 are provided at intervals in the circumferential direction to couple the annular portions 17a, 17b together. Pockets 16 of the cage 14 are each formed between the annular portions 17a, 17b and between the adjacent cage bars 18, 18 in the circumferential direction. One roller 13 is housed in each of the pockets 16. The annular portions 17a, 17b are positioned on the opposite sides of the rollers 13 in the axial direction. Thus, the rollers 13 are held by the cage 14 so as to restrict movement of the rollers 13.

Figure 4:
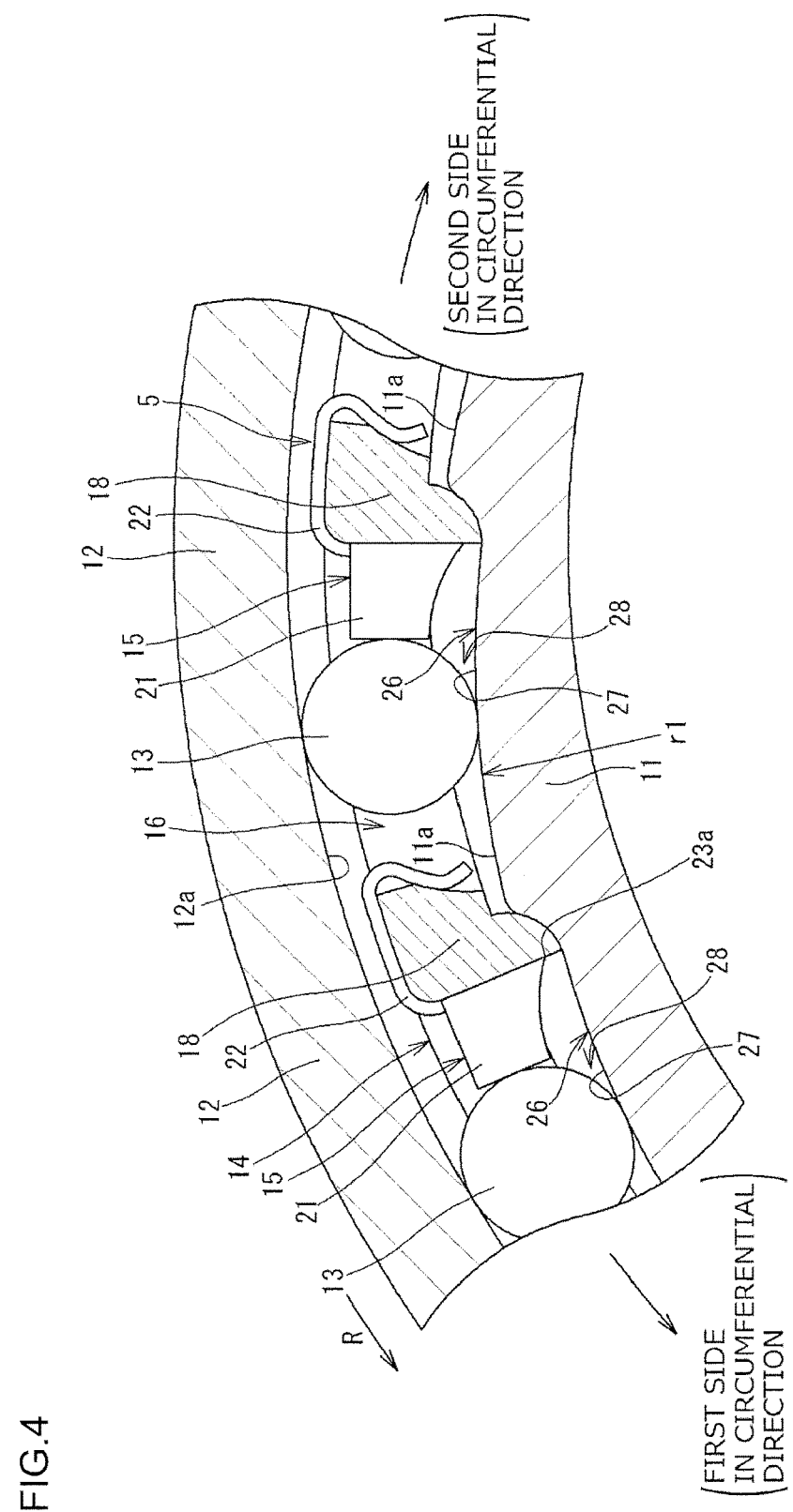
FIG. 4 is a diagram of the cage and a periphery thereof as viewed in an axial direction.

FIG. 4 is a sectional view of a part of the one-way clutch 5 as seen in the axial direction. In FIG. 3 and FIG. 4, each of the springs 15 has a pair of leaf spring piece portions 21 and an attachment portion 22. The leaf spring piece portions 21 come into contact with the corresponding roller 13 and are elastically deformed to push the roller 13. The attachment portion 22 attaches the leaf spring piece portions 21 to a part of the cage 14. The leaf spring piece portions 21, 21 are each a leaf spring extending from the attachment portion 22. The attachment portion 22 is fitted in and fixed to the corresponding cage bar 18. Consequently, the spring 15 is attached to a part (cage bar 18) of the cage 14 to allow the roller 13 in the corresponding pocket 16 to be biased toward a first side (in FIG. 3 and FIG. 4, leftward) in the circumferential direction.

The inner ring 11 has a plurality of recessed portions 26 on an outer periphery of the inner ring 11. The recessed portions 26 are recessed grooves that are recessed inward of an outer peripheral surface 11a of the inner ring 11 in the radial direction and that are arranged at regular intervals along the circumferential direction. The number of the recessed portions 26 is the same as the number of the rollers 13. In each of the recessed portions 26, the cam surface 27 is formed which has a radius r1 increasing toward the first side (in FIG. 3, leftward) in the circumferential direction. The cam surface 27 is configured such that the corresponding roller 13 is engaged between the cam surface 27 and the inner peripheral surface 12a of the outer ring 12. A wedge-like space 28 is formed between the cam surface 27 and the inner peripheral surface 12a of the outer ring 12 (a part of the inner peripheral surface 12a that faces the cam surface 27). The roller 13 can be trapped in the wedge-like space 28 for engagement. The spring 15 is configured to push the roller 13 in a direction in which the wedge-like space 28 is narrowed.

Bearing steel or carbon steel is adopted as a material for the inner ring 11, the outer ring 12, and the rollers 13. Spring steel is adopted as a material for the springs 15. The cage 14 is formed of resin, allowing the protruding portions 25 and the like to be easily formed by injection molding using a mold.

The above-described configuration allows the one-way clutch 5 to function as follows. When, in FIG. 1, the rotational speed of the outer ring 12, located closer to the pulley portion 2, is higher than the rotational speed of the inner ring 11 and the outer ring 12 rotates relative to the inner ring 11, in FIG. 4, the rollers 13 are engaged between the inner ring 11 (cam surfaces 27) and the outer ring 12, so that the inner ring 11 and the outer ring 12 is not allowed to rotate relative to each other (lock state). In FIG. 4, a rotating direction of the outer ring 12 is depicted by arrow R. When the rotational speed of the outer ring 12 is lower than the rotational speed of the inner ring 11, the rollers 13 are disengaged from the inner ring 11 and the outer ring 12, allowing the inner ring 11 and the outer ring 12 to rotate relative to each other (free state). As described above, the one-way clutch 5 is switched between the lock state and the free state, allowing rotational fluctuations of the endless belt (a crank shaft of an engine) to be absorbed.

The cage 14 will further be described. In FIG. 3, the cage 14 has an annular portion 17a on the first side in the axial direction (hereinafter referred to as a first annular portion 17a) and an annular portion 17b on the second side in the axial direction (hereinafter referred to as a second annular portion 17b). As depicted in FIG. 2, in the present embodiment, the first annular portion 17a and the second annular portion 17b have different sectional shapes.

Specifically, the first annular portion 17a has a larger axial dimension than the second annular portion 17b. The first annular portion 17a is thus formed to be elongate in the axial direction, allowing a side surface 35 of the first annular portion 17a to come into abutting contact with the rib portion 32 of the inner ring 11 in the axial direction. In other words, the side surface of the first annular portion 17a serves as an abutting contact surface 35 that comes into abutting contact with the rib portion 32 in the axial direction. The abutting contact surface 35 comes into surface contact with an annular surface 32a of the rib portion 32 located on the second side in the axial direction. Whereas the inner ring 11 is formed of steel, the cage 14 is formed of resin. Thus, the contact between the abutting contact surface 35 and the rib portion 32 is not metal-to-metal contact.

In the one-way clutch 5 including the cage 14 as described above, during assembly, the annular cage 14 may be moved in the axial direction with respect to the inner ring 11 in order to install the cage 14 on the outer periphery of the inner ring 11. In order to allow the one-way clutch 5 to function as described above, each roller 13 held by the cage 14 needs to be allowed to engage with the corresponding cam surface 27 of the inner ring 11. Thus, position management for the inner ring 11 (cam surfaces 27) and the rollers 13 in the axial direction is important. In the cage 14, the rollers 13 are held by the annular portions 17a, 17b so as to restrict movement of the rollers 13 in the axial direction as described above. Consequently, position management for the inner ring 11 (cam surfaces 27) and the rollers 13 in the axial direction substantially corresponds to position management for the inner ring 11 and the cage 14 in the axial direction. Thus, in the present embodiment, the cage 14 is moved in the axial direction with respect to the inner ring 11 to allow the abutting contact surface 35 of the first annular portion 17a of the cage 14 located on the first side in the axial direction to come into abutting contact with the side surface (annular surface 32a) of the rib portion 32 of the inner ring 11 in the axial direction as described above. This allows the cage 14 to be stably positioned in the axial direction. As a result, the rollers 13 held by the cage 14 can be installed at predetermined positions in the axial direction with respect to the inner ring 11 (cam surfaces 27). This allows the one-way clutch 5 to function as described above.

As described above, the first annular portion 17a has a larger axial dimension than the second annular portion 17b. Consequently, even when the rollers 13 are slightly away from the rib portion 32 in the axial direction, the abutting contact surface 35 can be brought into contact with the rib portion 32 while the function of the first annular portion 17a to hold the rollers 13 is maintained. In the present embodiment, the second annular portion 17b on the second side in the axial direction has a smaller axial dimension. This allows suppression of an increase in the size of the one-way clutch 5 as a whole in the axial direction.

In the above-described embodiment, the first annular portion 17a has a larger axial dimension than the second annular portion 17b. However, the first annular portion 17a and the second annular portion 17b may have the same annular dimension. Even in this case, the annular portion 17a, paired with the annular portion 17b and located on the first side in the axial direction, has the abutting contact surface 35 that comes into abutting contact with the rib portion 32 of the inner ring 11 in the axial direction.

The cage 14 will further be described. An outside diameter D1 of the first annular portion 17a is larger than an outside diameter D2 of the second annular portion 17b. Bore diameters of the first annular portion 17a and the second annular portion 17b are equal. In other words, the first annular portion 17a has a larger radial dimension than the second annular portion 17b. The outside diameter D1 of the first annular portion 17a is slightly smaller than the bore diameter of the main body tube portion 33 of the outer ring 12. Consequently, a labyrinth clearance K3 is formed between an outer peripheral surface (cylindrical surface 37) of the first annular portion 17a and an inner peripheral surface 38 of the main body tube portion 33. The inner peripheral surface 38 of the main body tube portion 33 is a cylindrical surface around a center line of the one-way clutch 5. The outer peripheral surface of the first annular portion 17a is also a cylindrical surface 37 around the center line of the one-way clutch 5. In other words, the first annular portion 17a on the first side in the axial direction has the cylindrical surface 37 having a predetermined length in the axial direction. The labyrinth clearance K3 is formed between the cylindrical surface 37 and the inner peripheral surface 38 of the outer ring 12.

As described above, the first annular portion 17a has a larger outside diameter dimension than the second annular portion 17b. Consequently, on the first side in the axial direction, the labyrinth clearance K3 is formed between the first annular portion 17a and the outer ring 12. This configuration enables grease inside the one-way clutch 5 from flowing from the first side in the axial direction to the outside of the one-way clutch 5. Moreover, as described above, the clearance K1 is formed between the first rib portion 32 of the inner ring 11 and the second rib portion 34 of the outer ring 12. The clearance K2 is formed between the first rib portion 32 and the second main body tube portion 33 of the outer ring 12. The clearances K1, K2 form a labyrinth clearance, allowing leakage of the grease to be more effectively prevented.

As described above, in the present embodiment, the first annular portion 17a of the cage 14 has a larger axial dimension and a larger outside diameter than the second annular portion 17b. The shapes of the one-way clutch 5 on the first and second sides in the axial direction are asymmetric. Thus, during assembly of the one-way clutch 5, an operator can avoid possible errors in assembly of the cage 14 that holds the rollers 13. In other words, when the cage 14 is moved in the axial direction with respect to the inner ring 11 and positioned on the outer periphery of the inner ring 11, possible errors in assembly of the cage 14 can be prevented by attaching the cage 14 such that the larger annular portion 17a is located on the side where the rib portion 32 is formed. If the cage 14 is assembled in the opposite direction, each spring 15 is placed at the opposite position with respect to the corresponding cam surface 27 (see FIG. 4), impairing the functions of the one-way clutch 5. However, the asymmetric shape of the cage 14 as in the present embodiment enables possible errors in assembly to be prevented.

Figure 5:
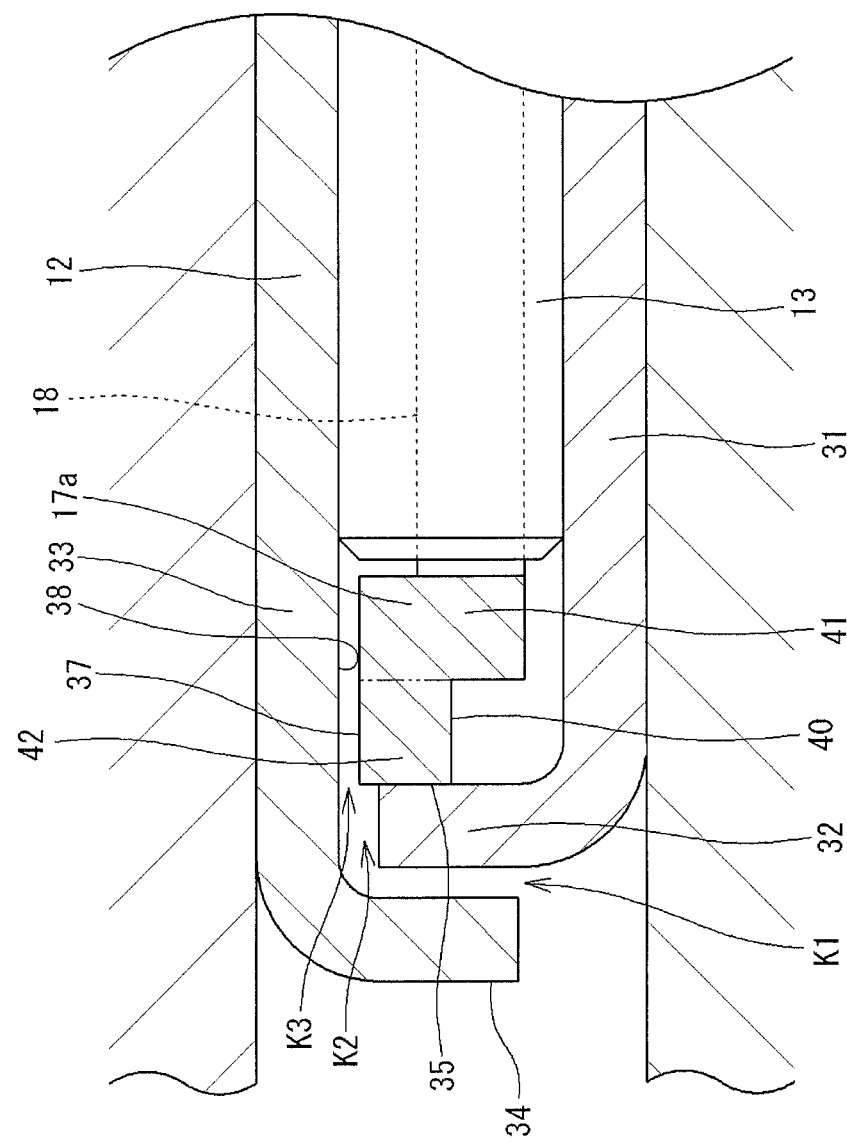
FIG. 5 is a sectional view depicting a variation of a first annular portion of the cage.
Figure 6:
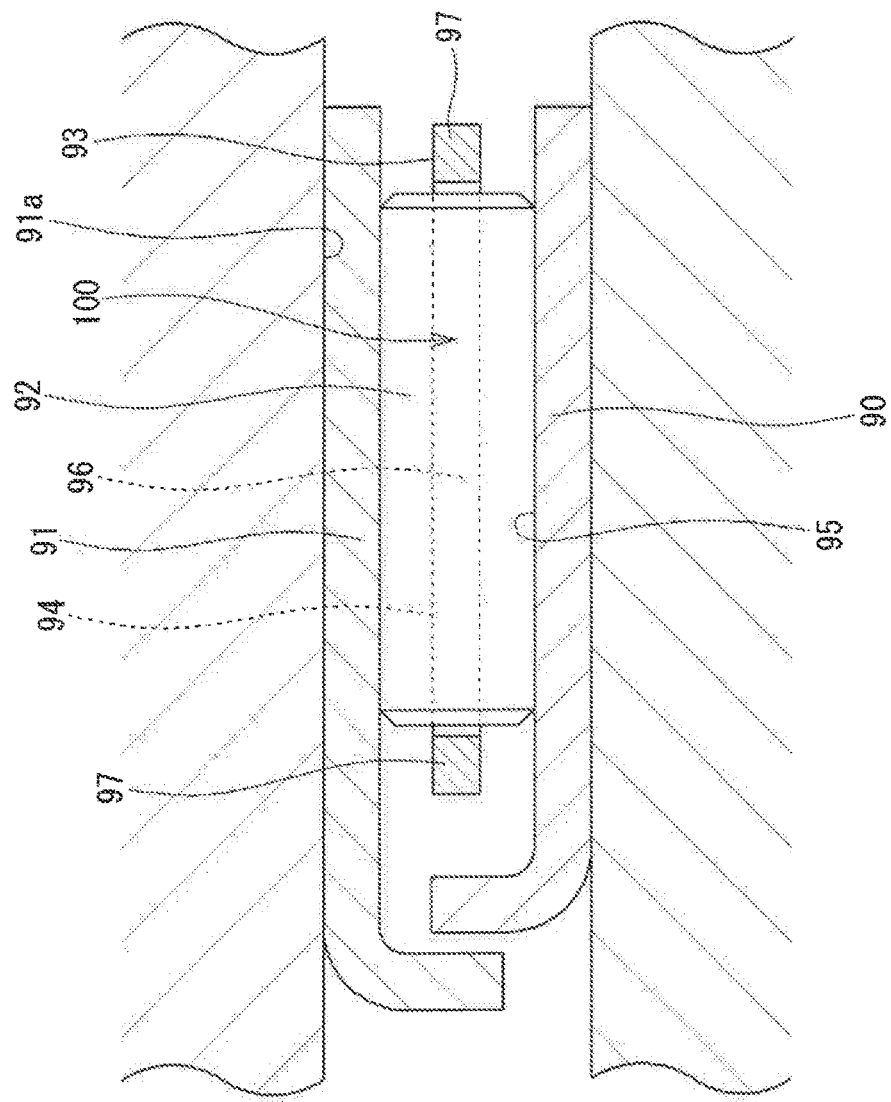
FIG. 6 is a diagram illustrating a conventional one-way clutch.
Figure 7:
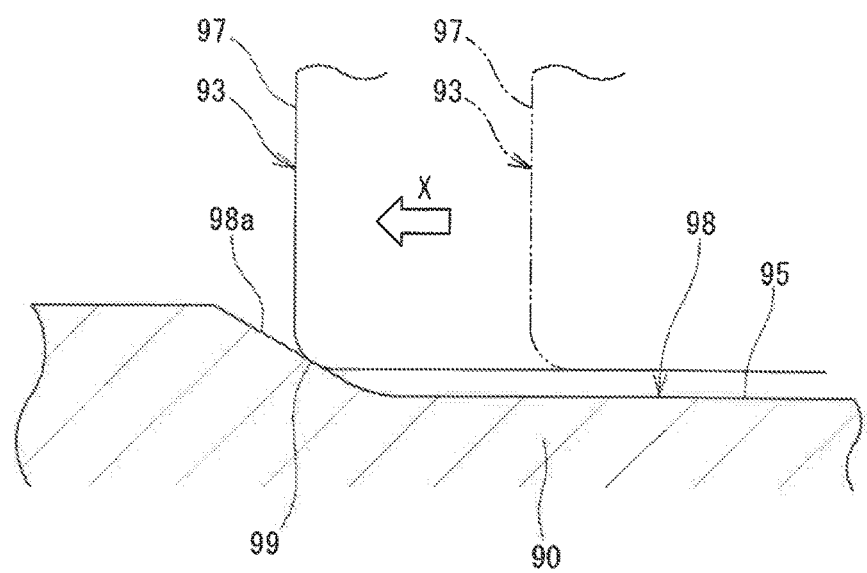
FIG. 7 is a diagram illustrating a part of the conventional one-way clutch.

FIG. 5 is a sectional view depicting a variation of the first annular portion 17a of the cage 14. The first annular portion 17a depicted in FIG. 2 has a rectangular section. However, a cutout portion 40 is formed in a part of the first annular portion 17a depicted in FIG. 5. Even in this case, the first annular portion 17a has the abutting contact surface 35 that comes into abutting contact with the rib portion 32 of the inner ring 11in the axial direction. Moreover, the first annular portion 17a has the cylindrical surface 37 having a predetermined length in the axial direction in order to form the labyrinth clearance K3 between the first annular portion 17a and the inner peripheral surface 38 of the main body tube portion 33 of the outer ring 12. The cutout portion 40 is formed in an area located on the inner periphery of the first annular portion 17a and on the first side in the axial direction. Consequently, a labyrinth clearance K3 is formed which is similar in form to the labyrinth clearance K3 depicted in FIG. 2.

The cutout portion 40 formed in the first annular portion 17a can be allowed to function as an area in which grease is stored. The first annular portion 17a depicted in FIG. 5 has a circular ring portion 41 located closer to the roller 13 and a cylindrical portion (built-up portion) 42 located closer to the rib portion 32. The cylindrical portion 42 is configured to protrude from an outer periphery of the circular ring portion 41 toward the first side in the axial direction.

In the form depicted in FIG. 5, the sectional shape (L-shaped section) of the first annular portion 17a remains unchanged all along the circumference but may vary. That is, the circular ring portion 41 is continuously formed all along the circumference and is shaped like a circular ring. However, the cylindrical portion 42 may be intermittently formed in the circumferential direction. Even in this case, a side surface of the cylindrical portion 42 on the first side in the axial direction serves as the abutting contact surface 35 that comes into abutting contact with the rib portion 32. In other words, the first annular portion 17a comes into abutting contact with the rib portion 32 at a plurality of portions of the circumference of the first annular portion 17a rather than all over the circumference thereof. Also for the first annular portion 17a depicted in FIG. 2, the first annular portion 17a may be configured to come into abutting contact with the rib portion 32 at a plurality of portions of the circumference of the first annular portion 17a rather than all over the circumference thereof. In other words, axially larger portions (built-up portions) may be intermittently formed in the first annular portion 17a. However, when the labyrinth clearance K3 is given top priority, the first annular portion 17a is preferably axially larger all over the circumference of the first annular portion 17a.

The embodiment disclosed above is illustrative in every way and is not restrictive. In other words, the one-way clutch in the invention is not limited to the illustrated embodiment but may be in any other embodiment within the scope of the invention. For example, besides the alternator, the one-way clutch 5 may be applied to any other type of rotating equipment.

The one-way clutch in the invention allows positioning of the cage in the axial direction to be stabilized, enabling the cage (the rollers held by the cage) to be installed at a predetermined position in the axial direction with respect to the inner ring.

What is claimed is:

1. A one-way clutch comprising:
an inner ring;
an outer ring;
a plurality of rollers provided between the inner ring and the outer ring;
an annular cage that holds the rollers; and
springs each bias a corresponding one of the rollers toward a first side in a circumferential direction of the one-way clutch, wherein
the inner ring has a first rib portion located at a terminal end of the inner ring on a first side in an axial direction and protruding outward in a radial direction,
the outer ring has a second rib portion located on the first side in the axial direction and protruding inward in the radial direction, the second rib portion being on the first side in the axial direction with respect to the first rib portion,
the cage has a pair of annular portions, one of the annular portions provided on the first side and the other provided on a second side in the axial direction with respect to the rollers, and a plurality of cage bars coupling the annular portions together,
the annular portion on the first side in the axial direction has an abutting contact surface that comes into abutting contact with the first rib portion in the axial direction, and
the first rib portion has an annular surface that is perpendicular to the axial direction.

2. The one-way clutch according to claim 1, wherein the annular portion on the first side in the axial direction has a cylindrical surface on an outer periphery of the annular portion, and a labyrinth clearance is formed between the cylindrical surface and an inner peripheral surface of the outer ring.

3. The one-way clutch according to claim 2, wherein the annular portion on the first side in the axial direction has a larger axial dimension than the annular portion on the second side in the axial direction.

4. The one-way clutch according to claim 3, wherein the annular portion on the first side in the axial direction has a larger outside diameter dimension than the annular portion on the second side in the axial direction.

5. The one-way clutch according to claim 2, wherein the annular portion on the first side in the axial direction has a larger outside diameter dimension than the annular portion on the second side in the axial direction.

6. The one-way clutch according to claim 1, wherein the annular portion on the first side in the axial direction has a larger axial dimension than the annular portion on the second side in the axial direction.

7. The one-way clutch according to claim 6, wherein the annular portion on the first side in the axial direction has a larger outside diameter dimension than the annular portion on the second side in the axial direction.

8. The one-way clutch according to claim 1, wherein the annular portion on the first side in the axial direction has a larger outside diameter dimension than the annular portion on the second side in the axial direction.

9. The one-way clutch according to claim 1, wherein the abutting contact surface of the annular portion is perpendicular to the axial direction.

10. The one-way clutch according to claim 1, wherein
the second rib portion faces the first rib portion via a first clearance in the axial direction,
an outer peripheral surface of the first rib portion faces an inner peripheral surface of the outer ring via a second clearance, and
the first clearance and the second clearance form a labyrinth clearance between the inner ring and the outer ring to prevent grease inside the one-way clutch from leaking from the first side in the axial direction to outside of the one-way clutch.

11. The one-way clutch according to claim 10, wherein the labyrinth clearance includes a third clearance between the inner peripheral surface of the outer ring and the one of the annular portions on the first side in the axial direction.

* * * * *